United States Patent
Holloway et al.

(10) Patent No.: US 9,900,390 B2
(45) Date of Patent: Feb. 20, 2018

(54) METHOD AND APPARATUS FOR CONTROLLING WAKE EVENTS IN A DATA PROCESSING SYSTEM

(71) Applicant: FREESCALE SEMICONDUCTOR, INC., Austin, TX (US)

(72) Inventors: David C. Holloway, Austin, TX (US); Benjamin C. Eckermann, Bee Cave, TX (US); Joseph P. Gergen, Manchaca, TX (US); Craig C. Hunter, Austin, TX (US); Bryan D. Marietta, Cedar Park, TX (US); David W. Todd, Austin, TX (US)

(73) Assignee: NXP USA, INC., Austin, TX (US)

( * ) Notice: Subject to any disclaimer, the term of this patent is extended or adjusted under 35 U.S.C. 154(b) by 362 days.

(21) Appl. No.: 14/718,826

(22) Filed: May 21, 2015

(65) Prior Publication Data

US 2016/0344820 A1 Nov. 24, 2016

(51) Int. Cl.
- G06F 1/26 (2006.01)
- G06F 1/32 (2006.01)
- H04L 29/08 (2006.01)
- H04L 12/933 (2013.01)

(52) U.S. Cl.
CPC ............. H04L 67/145 (2013.01); G06F 1/32 (2013.01); H04L 49/109 (2013.01); G06F 1/26 (2013.01)

(58) Field of Classification Search
CPC ........ G06F 9/445–9/546; G06F 13/364; G06F 1/26–1/364; H04L 12/2803–12/282; H04L 67/10–67/145; H04N 1/00915–1/0096; H04N 21/23418–21/2385; H04N 7/147–7/15; H04N 7/17309–7/17336; H04W 52/02–52/0219; H04W 72/005
See application file for complete search history.

(56) References Cited

U.S. PATENT DOCUMENTS

| | | | | |
|---|---|---|---|---|
| 5,583,419 A | * | 12/1996 | Haller | H02J 3/14 307/19 |
| 6,449,488 B1 | * | 9/2002 | Cheng | H04W 72/005 340/7.3 |
| 6,717,690 B1 | * | 4/2004 | Salgado | H04N 1/00915 358/1.14 |
| 6,910,212 B2 | * | 6/2005 | Brenner | G06F 9/526 707/999.003 |
| 9,313,455 B1 | * | 4/2016 | Moeeni | H04N 7/15 |
| 9,671,846 B1 | * | 6/2017 | Davis | G06F 1/28 |
| 2003/0237008 A1 | * | 12/2003 | Freevol | G06F 1/30 713/300 |
| 2004/0103231 A1 | * | 5/2004 | Zhu | G06F 13/364 710/113 |

(Continued)

*Primary Examiner* — Wing F Chan
*Assistant Examiner* — Raji Krishnan

(57) ABSTRACT

A system and methods controlling wake events in a data processing system is described. A broadcast wake-up signal staggering order is determined in response to a first wake event. A staggered broadcast wake-up signal is distributed to a plurality of processing elements based on the broadcast wake-up signal staggering order. The broadcast wake-up signal staggering order is changed in response to a second wake event. And a changed staggered broadcast wake-up signal is distributed to a plurality of processing elements based on the changed broadcast wake-up signal staggering order.

17 Claims, 2 Drawing Sheets

(56) References Cited

U.S. PATENT DOCUMENTS

| | | | |
|---|---|---|---|
| 2007/0097895 A1* | 5/2007 | Keshavarzian | H04W 52/0219 370/311 |
| 2008/0028238 A1* | 1/2008 | Lucas | G06F 1/26 713/300 |
| 2009/0204834 A1* | 8/2009 | Hendin | G06F 1/22 713/323 |
| 2011/0161599 A1 | 6/2011 | Craske | |
| 2012/0280788 A1* | 11/2012 | Nowottnick | G06K 19/07767 340/5.61 |
| 2013/0198545 A1 | 8/2013 | Lee et al. | |
| 2013/0318380 A1 | 11/2013 | Behrens et al. | |
| 2014/0281614 A1* | 9/2014 | Mick | G05D 23/1917 713/322 |
| 2014/0351374 A1* | 11/2014 | Canoy | G06N 99/005 709/217 |
| 2016/0080140 A1* | 3/2016 | Gach | H04L 12/6418 375/360 |
| 2016/0118988 A1* | 4/2016 | Sood | H03K 19/17784 327/538 |
| 2016/0294281 A1* | 10/2016 | Kulkarni | G06F 3/041 |

* cited by examiner

METHOD AND APPARATUS FOR CONTROLLING WAKE EVENTS IN A DATA PROCESSING SYSTEM

BACKGROUND

Field

This disclosure relates generally to data processing, and more specifically, to a method and apparatus for controlling wake events in a data processing system.

Related Art

To reduce power consumption in a data processing system, portions of the system may be put in a quiescent, or sleep, state when appropriate to save power. A mechanism must be put in place to wake up the sleeping portions. In a large system, waking significantly sized components of the system simultaneously will create a large and detrimental power surge. The power surge (large in-rush current) will create significant voltage droop, potential data corruption, decreased maximum operating frequency, and increased cost in board design and/or expensive power supplies. To reduce the power surge, the waking process does not wake the entire system at the same time, but in a staggered manner to reduce the power surge. However, during a staggered wake-up in response to a first wake-up request, a subsequent second wake-up request may not be detected by some of the elements in the system.

Therefore, there exists a need for a method and system that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
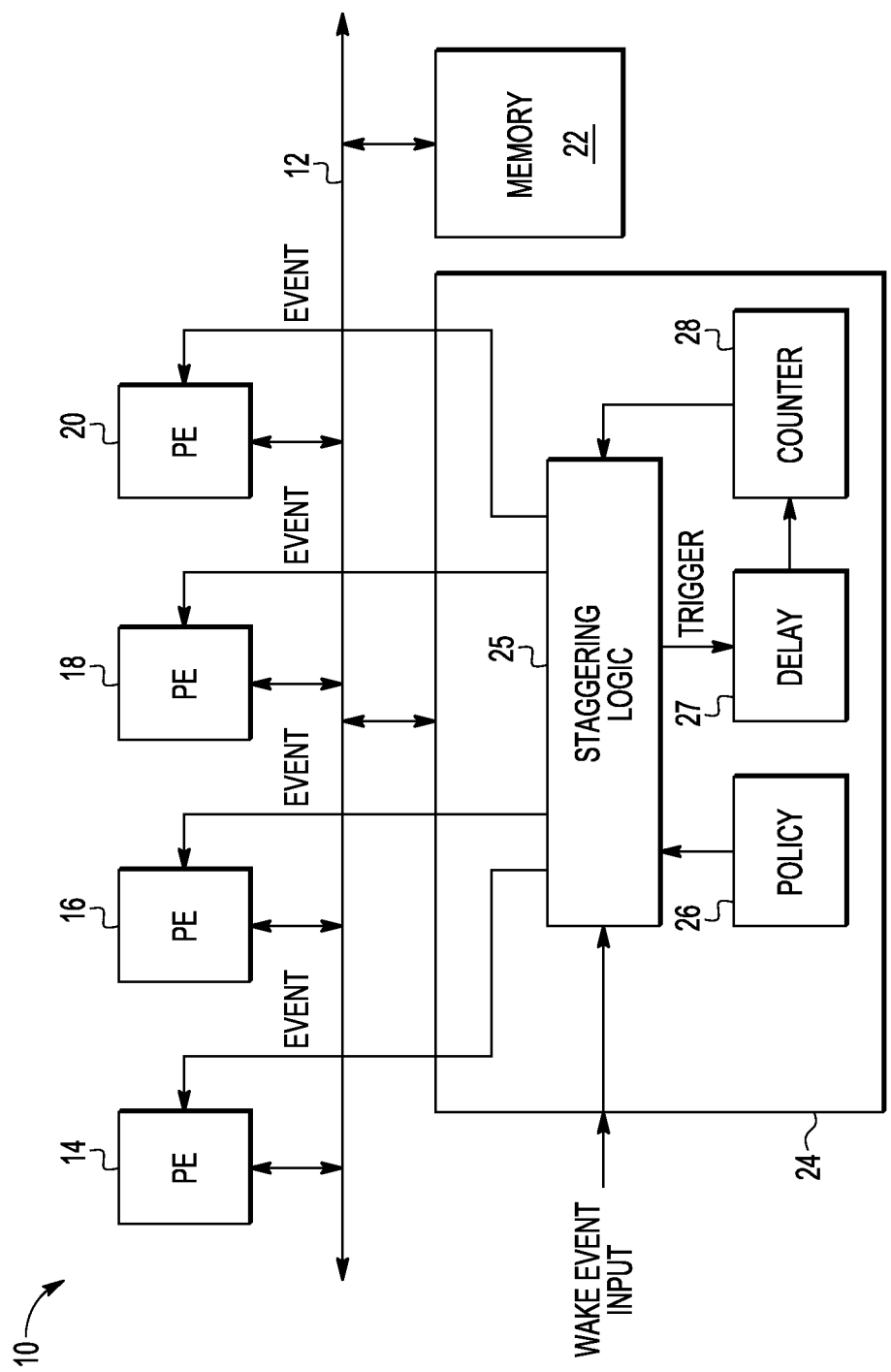
FIG. 1 illustrates, in block diagram form, a data processing system in accordance with an embodiment.

Generally, there is provided, a method for controlling wake events in a data processing system. The data processing system includes multiple processing elements and wake-up staggering logic. The wake-up staggering logic receives a first broadcast wake event and determines a staggering order for distributing a first event signal to the processing elements in response to the first broadcast wake event. If a second broadcast wake event is received before the first event signal is distributed, the wake-up staggering logic determines if a predetermined staggering policy requires the delivery of the first event signal to be restarted or continued. After the first event signal is restarted or continued, then a staggering order for the second broadcast wake event is determined and a set of staggered events is provided to the processing elements. Also, each time a wake event signal is broadcast, an order for distributing the broadcast wake event signal is changed. Any technique may be used to change the order, such as for example, a rotating order such as round robin, or randomly.

Restarting the staggered distribution of the event signals insures that all of the processing elements receives the wake up event. Also, by changing the order of the staggered wake events, each processing element is insured of having an opportunity to acquire, for example, a semaphore necessary for the processing element to continue processing.

In one embodiment, there is provided, a method for controlling wake events in a data processing system, the method comprising: determining a broadcast wake-up signal staggering order in response to a first wake event; distributing a first staggered broadcast wake-up signal to a plurality of processing elements based on the broadcast wake-up signal staggering order; changing the broadcast wake-up signal staggering order in response to a second wake event; and distributing a second staggered broadcast wake-up signal to a plurality of processing elements based on the changed broadcast wake-up signal staggering order. The method may further comprise determining which processing elements in the plurality receive the first staggered broadcast wake-up signal The second wake event may occur during distributing the first staggered broadcast wake-up signal, and wherein distributing the second broadcast wake-up signal may further comprise distributing the second staggered broadcast wake-up signal to the plurality of processing elements after stopping the distributing of the first staggered broadcast wake-up signal to the plurality of processing elements during the process of distributing the first staggered broadcast wake-up signal. Distributing the first staggered broadcast wake-up signal may include distributing a set of staggered broadcast wake-up signals, each signal in the set staggered according to a programmable delay. The broadcast wake-up signal staggering order may be based on a rotating policy. Distributing a second staggered broadcast wake-up signal may include distributing the second staggered broadcast wake-up signal to the processing elements in the plurality which received the first staggered broadcast wake-up signal before the second wake event. The first wake event or the second wake event may be provided by one of the processing elements in the plurality. The first wake event or the second wake event may be an indication of a semaphore availability. The first staggered broadcast wake-up signal and the second staggered broadcast wake-up signal may be a pulsed signal provided to at least one of the processing elements in the plurality. At least one of the processing elements may be in a low power state when receiving the first staggered broadcast wake-up signal or the second staggered broadcast wake-up signal.

In another embodiment, there is provided, a method for controlling wake events in a data processing system, the method comprising: receiving a first wake event; distributing a first staggered broadcast wake-up signal to a plurality of processing elements in response to the first wake event; receiving a second wake event during the distributing of the first staggered broadcast wake-up signal; and distributing a second staggered broadcast wake-up signal to the plurality of processing elements in response to the second wake event. Distributing a second staggered broadcast wake-up signal to the plurality of processing elements in response to the second wake event may comprise distributing the second staggered broadcast wake-up signal to the processing elements of the plurality which are awakened by receiving the first staggered broadcast wake-up signal. Distributing a second staggered broadcast wake-up signal to the plurality of processing elements in response to the second wake event may comprise distributing the second staggered broadcast wake-up signal to the plurality of processing elements after all of the processing elements in the plurality received the first staggered broadcast wake-up signal. The first wake event or the second wake event may be provided by one of the processing elements in the plurality. Distributing a first staggered broadcast wake-up signal includes distributing a set of staggered broadcast wake-up signals, each signal in the set being staggered according to a programmable delay. The first wake event or the second wake event may be an indication of a semaphore availability. Distributing a second broadcast wake-up signal may further comprise distributing the second staggered broadcast wake-up signal to the plurality of processing elements after stopping the distributing of the first staggered broadcast wake-up signal to the plurality of processing elements during the process of distributing the first staggered broadcast wake-up signal.

In yet another embodiment, there is provided, a data processing system, comprising: a plurality of processing elements, each processing element of the plurality having an input to receive a wake-up signal; a staggering unit having an input for receiving a wake event signal and a set of outputs, each output of the set coupled to a corresponding processing element input, the staggering unit for distributing a first staggered broadcast wake-up signal via the set of outputs to the plurality of processing elements based on a first broadcast wake-up signal staggering order determined in response to a first wake event received at the input of the staggering unit; and wherein the staggering unit distributes a second staggered broadcast wake-up signal to the plurality of processing elements based on a second broadcast wake-up signal staggering order determined in response to a second wake event received at the input of the staggering unit, the second wake event occurring during the distributing of the first staggered broadcast wake-up signal. The staggering unit may include a delay unit coupled to a counter unit for staggering each staggered signal according to a predetermined delay. The second staggered broadcast wake-up signal to the plurality of processing elements may be based on a second broadcast wake-up signal staggering order determined in response to the second wake event.

FIG. 1 illustrates, in block diagram form, a data processing system 10 in accordance with an embodiment. In the illustrated embodiment, data processing system 10 is a system-on-a-chip (SoC) implemented on a single integrated circuit. In another embodiment, data processing system 10 may be implemented differently. Data processing system 10 includes communication bus 12, processing elements 14, 16, 18, and 20, memory 22, and wake-up staggering unit 24. Wake-up staggering unit 24 includes staggering logic 25, staggering policy 26, programmable delay 27, and counter 28. Processing elements 14, 16, 18, and 20 are circuit portions that receive events such as interrupts, wake events, debug events, or reset. There can be any number of processing elements. In one embodiment, processing elements 14, 16, 18, and 20 are each central processing units. In another embodiment, processing elements 14, 16, 18, and 20 are modules in a central processing unit. Also, a processing element may include multiple modules or multiple central processing units or a combination of modules and central processing units. In addition, processing elements 14, 16, 18, and 20 may be control circuitry or other circuitry other than central processing units that have a low power state.

Each of processing elements 14, 16, 18, and 20 are bi-directionally coupled to communication bus 12. In one embodiment, bus 12 is a conventional bus having a plurality of conductors for communicating address, data, and control information. In other embodiments, bus 12 may be an interconnect structure such as for example, a cross-bar switch or other form of SoC interconnect system. Examples of SoC interconnect systems include ARM's CCN-504 interconnect or ARM's CCI-400 interconnect. Memory 22 is bi-directionally coupled to bus 12 for providing and receiving data from the processing elements 14, 16, 18, and 20. Memory 22 may be main memory or a hierarchal cache structure for use by the various blocks of data processing system 10.

In data processing system 10, wake events are events that trigger one or more processing elements to transition from a lower power operating state to a higher power operating state. Some events are provided to individual processing elements and some events are broadcast to some or all of the processing elements. When events are broadcast to some or all of processing elements 14, 16, 18, and 20, staggering logic 25 in wake-up staggering unit 24 receives a broadcast wake event input signal WAKE EVENT INPUT and in response, distributes a staggered event signal EVENT to each of processing elements 14, 16, 18, and 20 one at a time over a time period. Each of the processing elements receives the same broadcast staggered event signal EVENT. The WAKE EVENT INPUT signal may be a pulse received from a source external to data processing system 10, or from one of the processing elements on data processing system 10. The staggered EVENT signals are based on the WAKE EVENT INPUT signal. In one embodiment, the EVENT signal is a pulse that is broadcast to each of the processing elements over a dedicated conductor. In another embodiment, the EVENT signal may be a multi-bit signal transmitted over, for example, a bus or network. The distributed EVENT signal will cause a receiving processing element that is in a low power state, such as a sleep state, to exit the low power state. The processing element may exit the low power state by resetting its state.

The amount of time required to distribute the staggered EVENT signals is determined by predetermined delay block 27 and counter 28 by setting the time between each EVENT signal. Staggering logic 25 provides a trigger signal labeled "TRIGGER" to start a delay period when the set of staggered event signals is provided. Staggering the distribution of events prevents the large in-rush current present when some or all of the processing elements wake-up simultaneously. However, if a second, or subsequent, WAKE EVENT INPUT signal is received while the first EVENT signal is being distributed, the receipt of the second EVENT signal may cause one or more of the processing elements to not receive the first EVENT signal. The problem of processing elements not receiving the first EVENT signal may be caused when subsequent processing elements to receive the staggered EVENT signal are starved of information they require to continue. Therefore, in the illustrated embodiment, if a second staggered EVENT signal is caused to be distributed in response to a broadcast WAKE EVENT INPUT signal before completion of the distribution of a first staggered EVENT signal, then the status of the second event is held, and the distribution of some portion or all of the first staggered EVENT signal sequence is repeated to insure all of the processing elements are notified of the wake event.

There are several ways staggered EVENT signals can be delivered when the second EVENT signal occurs during the distribution of the first staggered wake event signal. For example, the staggered EVENT signal distribution can be repeated after the distribution of the first staggered EVENT signal is complete. Another way is to stop the first staggered event before completion and immediately start the second staggered event. Yet another way is to only repeat the delivery of the first EVENT signal to the one or more processing elements that did not receive the second EVENT signal. Repeating delivery of the first staggered event signals insures that all of the processing elements receive the broadcast event signals.

When broadcast events are distributed to processing elements 14, 16, 18, and 20 in a staggered manner, the last processing elements to receive the broadcast events have a lower probability of having access to shared resources of data processing system 10, for example, a semaphore. To increase the probability that all of the processing elements have an opportunity to access shared resources, a staggering order of the distribution of the wake event signals is changed so that a different processing element is first to in the distribution of the staggered wake event signals. The order that processing elements 14, 16, 18, and 20 receives the EVENT signals is determined by staggering policy block 26. In one embodiment, the ordering is based on a rotating policy such as "round robin". In another embodiment, the ordering may be based on a different policy, such as for example, a random order.

For purposes of describing the embodiment, a broadcast wake event signal is considered to be broadcast to all of processing elements 14, 16, 18, and 20, however in other embodiments the broadcast wake event signals are considered broadcast if they are distributed to more than one of the processing elements.

Figure 2:
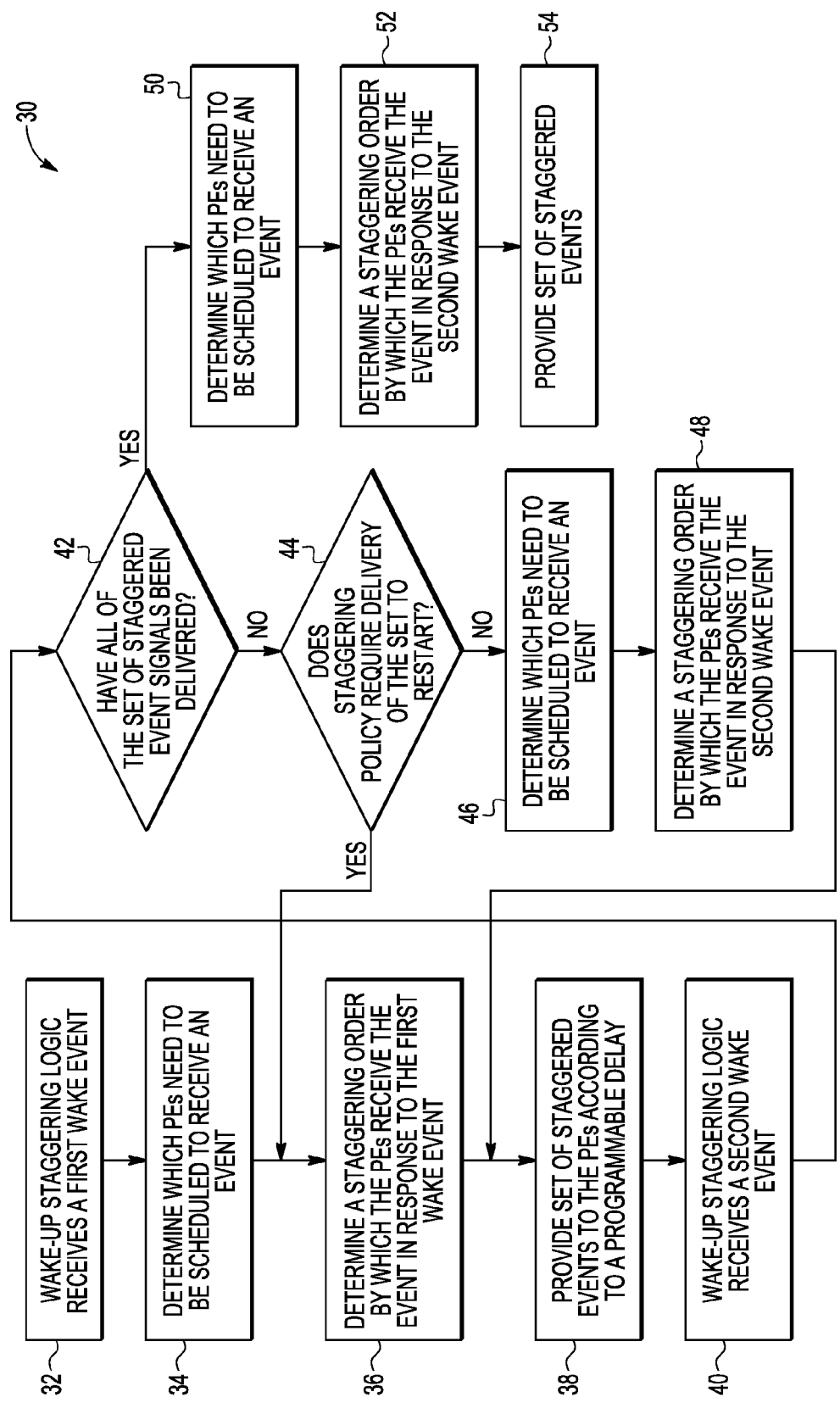
FIG. 2 illustrates a flow chart of a method for controlling wake events in a data processing system.

FIG. 2 illustrates a flow chart of a method 30 for controlling wake events in a data processing system. Method 30 begins at step 32. At step 32, wake-up staggering block 24 receives a first broadcast WAKE EVENT INPUT signal. The WAKE EVENT INPUT signal is provided to staggering logic 25. At step 34, it is determined from the WAKE EVENT INPUT signal that a set of staggered wake EVENT signals is to be broadcast to all of processing elements 14, 16, 18, and 20. The wake event may be, for example, a power management wake-up condition, an interrupt, or a reset operation. At step 36, a staggering order is determined by staggering policy 26 for providing the first set of staggered wake EVENT signals to processing elements 14, 16, 18, and 20. At step 38, a delay period is chosen for the set of staggered wake EVENTS. The delay period may be user programmable, and determines the length of time required for the staggered wake EVENT signals to the distributed. At step 40, a second broadcast WAKE EVENT INPUT signal, received subsequent to the first broadcast WAKE EVENT INPUT signal, is received by wake-up staggering block 24. At decision step 42, it is determined if the entire first set of staggered wake EVENT signals have been delivered. If all of the first set of staggered wake EVENT signals has been delivered, then the second broadcast WAKE EVENT INPUT signal is not being received during delivery of the first set of staggered EVENT signals, and the YES path is taken to step 50. At step 50, it is determined which processing elements need to be scheduled to receive an event signal EVENT. In the illustrated embodiment, all of processing elements 14, 16, 18, and 20 need to be scheduled to receive an event signal EVENT. At step 52, a staggering order of the processing elements is determined for receipt of the EVENT signal in response to the second WAKE EVENT INPUT signal. Any method for choosing an order may be used, such as for example, a rotating, round robin, or random method. At step 54 the second set of staggered EVENT signals are provided to processing elements 14, 16, 18, and 20 according the programmable delay of delay 27.

Returning to decision step 42, if all of the first set of staggered EVENT signals has not been delivered, then the second WAKE EVENT INPUT signal was received during delivery of the first set of staggered EVENT signals, and the NO path is taken from decision step 42 to decision step 44. At decision step 44, it is determined if the staggering policy 26 requires delivery of the first set of staggered EVENTS to be restarted. If the staggering policy does require the delivery to restart, then the YES path is taken to step 36. At step 36, a staggering order is determined by staggering policy 26 for restarting delivery of the first set of staggered wake EVENT signals to processing elements 14, 16, 18, and 20. At step 38, a delay period is chosen for the set of staggered wake EVENTS. The delay period determines the length of time required between the staggered wake EVENT signals to be distributed. The delay period may be different for the re-delivery. At step 40, another broadcast WAKE EVENT INPUT signal may be received subsequent to the re-delivery of first broadcast WAKE EVENT INPUT signal. Any subsequent broadcast WAKE EVENT INPUT signal is handled as described above for the second broadcast WAKE EVENT INPUT signal when the second WAKE EVENT INPUT is received before delivery of the first staggered set of EVENT signals is complete.

Returning to decision step 44, if it is determined that the staggering policy does not require delivery of the first set of staggered EVENT signals to be restarted, then the NO path is taken to step 46. At step 46, it is determined which processing elements need to be scheduled to receive an event. At step 48, a staggering order for the processing elements is determined. Then steps 38, 40, and 42 are repeated as described above.

The described embodiment insures that all processing elements receive a wake event, and provides a fairness policy for access to shared resources, such as a semaphore, when broadcast wake events are staggered to reduce a power surge.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for controlling wake events in a data processing system, the method comprising:
   determining a broadcast wake-up signal staggering order in response to a first wake event;
   distributing a first staggered broadcast wake-up signal to a plurality of processing elements in a system-on-a-chip based on the broadcast wake-up signal staggering order, wherein the first staggered broadcast wake-up signal causes each of the processing elements to exit a sleep state in response to the first staggered broadcast wake-up signal being received by the processing element;
   receiving a second wake event during the distributing of the first staggered broadcast wake-up signal;
   changing the broadcast wake-up signal staggering order in response to the second wake event; and
   distributing a second staggered broadcast wake-up signal to the plurality of processing elements based on the changed broadcast wake-up signal staggering order, wherein distributing a second staggered broadcast wake-up signal includes distributing the second staggered broadcast wake-up signal to the processing elements in the plurality which received the first staggered broadcast wake-up signal before the second wake event.

2. The method of claim 1, further comprising determining which processing elements in the plurality receive the first staggered broadcast wake-up signal.

3. The method of claim 1, wherein distributing the second broadcast wake-up signal further comprises distributing the second staggered broadcast wake-up signal to the plurality of processing elements after stopping the distributing of the first staggered broadcast wake-up signal to the plurality of processing elements during the process of distributing the first staggered broadcast wake-up signal.

4. The method of claim 1, wherein distributing the first staggered broadcast wake-up signal includes distributing a set of staggered broadcast wake-up signals, each signal in the set staggered according to a programmable delay.

5. The method of claim 1, wherein the broadcast wake-up signal staggering order is based on a rotating policy.

6. The method of claim 1, wherein the first wake event or the second wake event is provided by one of the processing elements in the plurality.

7. The method of claim 1, wherein the first wake event or the second wake event is an indication of a semaphore availability.

8. The method of claim 1, wherein the first staggered broadcast wake-up signal and the second staggered broadcast wake-up signal is a pulsed signal provided to at least one of the processing elements in the plurality.

9. The method of claim 1, wherein at least one of the processing elements is in a low power state when receiving the first staggered broadcast wake-up signal or the second staggered broadcast wake-up signal.

10. A method for controlling wake events in a data processing system, the method comprising:
    receiving a first wake event;
    distributing a first staggered broadcast wake-up signal to a plurality of processing elements in a system-on-a-chip in response to the first wake event, wherein the first staggered broadcast wake-up signal causes each of the processing elements to exit a sleep state in response to the first staggered broadcast wake-up signal being received by the processing element;
    receiving a second wake event during the distributing of the first staggered broadcast wake-up signal; and
    distributing a second staggered broadcast wake-up signal to a subset of the plurality of processing elements that had received the first staggered broadcast wake-up signal before the second wake event was received in response to the second wake event.

11. The method of claim 10, wherein distributing a second staggered broadcast wake-up signal to the plurality of processing elements in response to the second wake event comprises distributing the second staggered broadcast wake-up signal to the plurality of processing elements after all of the processing elements in the plurality received the first staggered broadcast wake-up signal.

12. The method of claim 10, wherein the first wake event or the second wake event is provided by one of the processing elements in the plurality.

13. The method of claim 10, wherein distributing a first staggered broadcast wake-up signal includes distributing a set of staggered broadcast wake-up signals, each signal in the set being staggered according to a programmable delay.

14. The method of claim 10, wherein the first wake event or the second wake event is an indication of a semaphore availability.

15. The method of claim 10, wherein distributing a second broadcast wake-up signal further comprises distributing the second staggered broadcast wake-up signal to the plurality of processing elements after stopping the distributing of the first staggered broadcast wake-up signal to the plurality of processing elements during the process of distributing the first staggered broadcast wake-up signal.

16. A data processing system, comprising:
    a plurality of central processing circuits in a system-on-a-chip, each central processing circuit of the plurality having an input to receive a wake-up signal; and
    a staggering unit in the system-on-a-chip having an input for receiving a wake event signal and a set of outputs, each output of the set coupled to a corresponding central processing circuit input, the hardware staggering unit to distribute a first staggered broadcast wake-up signal via the set of outputs to the plurality of central processing circuits based on a first broadcast wake-up signal staggering order determined in response to a first wake event received at the input of the staggering unit, wherein the first staggered broadcast wake-up signal causes each of the central processing circuits to exit a sleep state in response to the first staggered broadcast wake-up signal being received by the central processing circuit;
    wherein the staggering unit to change the first broadcast wake-up signal staggering order to a second broadcast wake-up signal staggering order determined in response to a second wake event received at the input of the staggering unit, the second wake event occurring during the distributing of the first staggered broadcast wake-up signal, and to distribute a second staggered broadcast wake-up signal to the plurality of central processing circuits based on the second broadcast wake-up signal, wherein distributing a second staggered broadcast wake-up signal includes distributing the second staggered broadcast wake-up signal to the processing elements in the plurality which received the first staggered broadcast wake-up signal before the second wake event.

17. The data processing system of claim 16, wherein the staggering unit includes a delay unit coupled to a counter unit for staggering each staggered signal according to a predetermined delay.

\* \* \* \* \*